Dec. 1, 1953  H. L. HARTMAN  2,660,896
SELECTIVE PLURAL SPEED FRICTIONAL DRIVE MECHANISM
Filed July 23, 1949  4 Sheets-Sheet 1

Herbert L. Hartman INVENTOR.

BY Slough & Slough
His Attorneys

Dec. 1, 1953  H. L. HARTMAN  2,660,896
SELECTIVE PLURAL SPEED FRICTIONAL DRIVE MECHANISM
Filed July 23, 1949  4 Sheets-Sheet 2
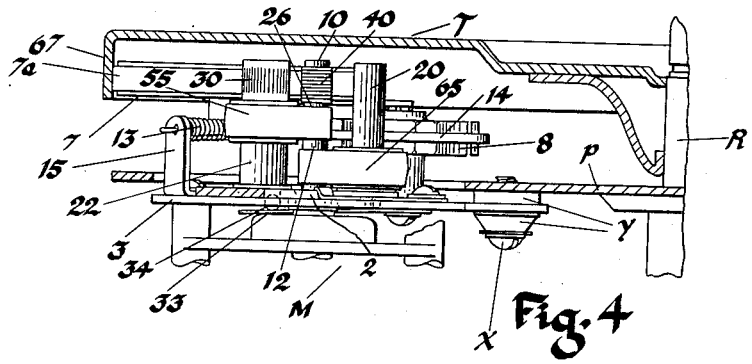
Fig. 4
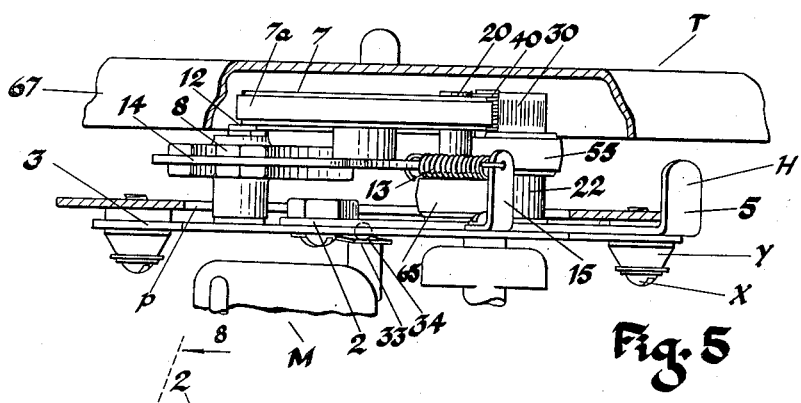
Fig. 5
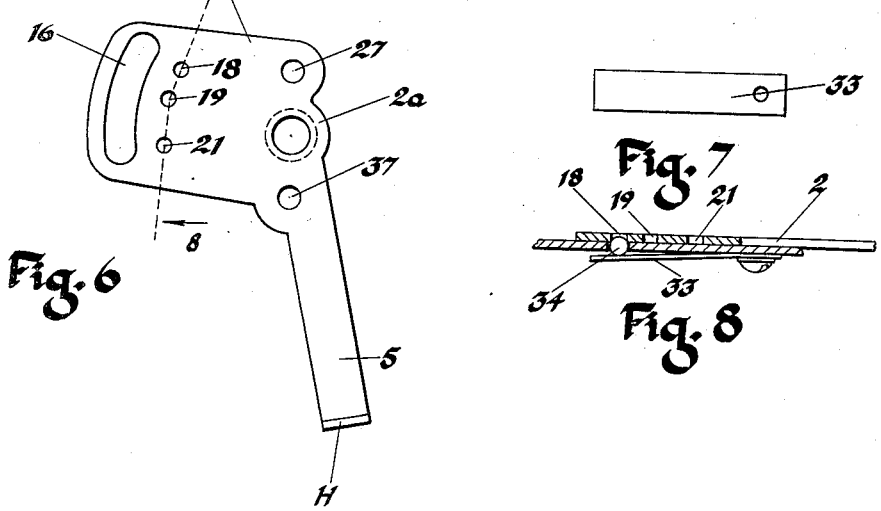
Fig. 6
Fig. 7
Fig. 8
Herbert L. Hartman, INVENTOR.
BY Slough & Slough
His Attorneys Dec. 1, 1953     H. L. HARTMAN     2,660,896
SELECTIVE PLURAL SPEED FRICTIONAL DRIVE MECHANISM
Filed July 23, 1949     4 Sheets-Sheet 3
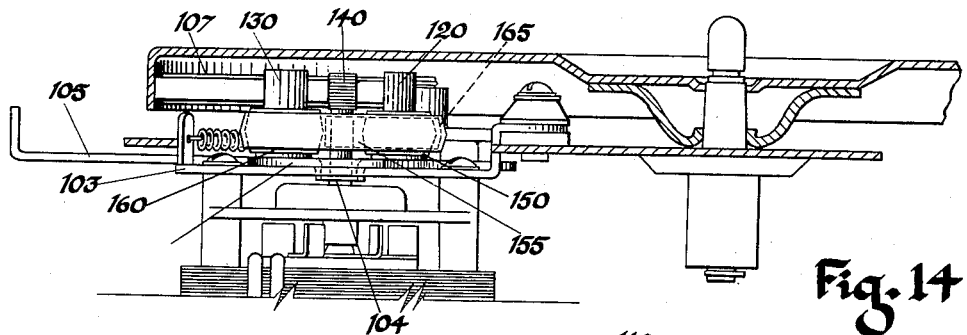
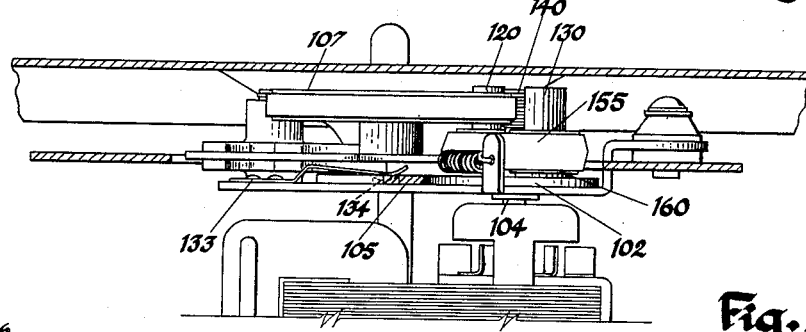
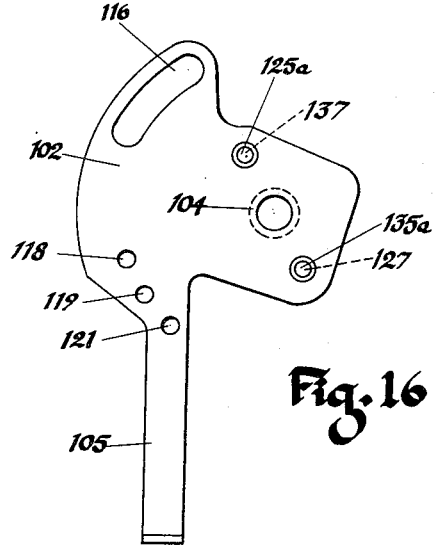
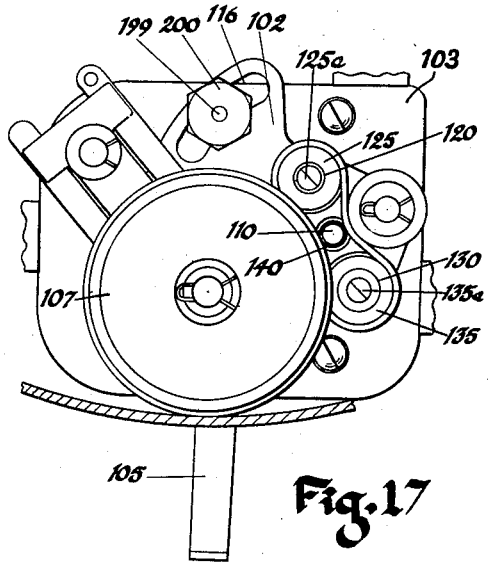
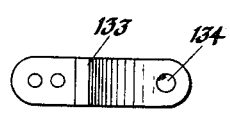
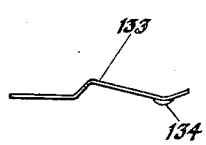
Herbert L. Hartman, INVENTOR.
BY Slough & Slough
His Attorneys.

Dec. 1, 1953  H. L. HARTMAN  2,660,896
SELECTIVE PLURAL SPEED FRICTIONAL DRIVE MECHANISM
Filed July 23, 1949  4 Sheets-Sheet 4

Herbert L. Hartman, INVENTOR.
BY Slough + Slough
His Attorneys

Patented Dec. 1, 1953

2,660,896

UNITED STATES PATENT OFFICE 2,660,896

SELECTIVE PLURAL SPEED FRICTIONAL DRIVE MECHANISM

Herbert L. Hartman, Elyria, Ohio, assignor to The General Industries Company, Elyria, Ohio, a corporation of Ohio Application July 23, 1949, Serial No. 106,365

20 Claims. (Cl. 74—199)

My invention relates to friction drives for phonograph turntables, and relates more particularly to an improved friction drive adapted to be selectively set to drive the phonograph turntable at a selected one of a plurality of rotationally uniform speeds.

Heretofore, as exemplified in United States Letters Patent No. 2,438,264, dated March 23, 1948, granted to Joseph Bender Jr., it has been proposed to drive a phonograph turntable by an electric motor, whose vertically extending shaft is provided with a pair of superposed friction driving pulley portions of progressively different diameters, and to furthermore provide an idler wheel making concurrent frictional engagement with a pendant annular flange of the turntable which is of sufficient vertical extent as to permit vertical adjustment of said idler wheel, and with the surface of either of the two driving pulley portions, to whose level, by selective adjustment, the idler wheel is alternately shifted.

My present invention relates to a friction drive mechanism wherein it is not necessary to vertically move either the idler wheel, or the shaft which affords the pulley portions, in order to achieve the selective adjustment for different turntable speeds, this being accomplished by providing one or more idler pulleys each having a pair of relatively superposed pulley portions, said idler pulleys being disposed laterally of a primary drive shaft pulley, the latter being carried by the motor shaft, said idler pulley or pulleys being frictionally driven by the said primary roller, preferably by means of a pulley and belt transmission element, whereby by laterally adjustably swinging one or both of said driving and/or driven, idler pulleys, these may be interchangeably engaged with the periphery of said idler wheel.

My invention contemplates the provision of a mechanism adapted to achieve selective driving of a phonograph turntable at any one of two or more rotative speeds according to the interchangeable placement of a primary drive pulley, or of one or more secondary or idler pulleys in peripheral engagement with a final drive wheel of the mechanism, which in turn is adapted to be disposed in peripheral engagement with an annular element of a turntable which preferably is in the form of a peripheral pendant turntable flange, such engagement being preferably with an inner concavely annular surface of said flange.

My present invention is therefore a continuation, in part, of my previously filed application, Serial No. 22,348, filed April 21, 1948, and additionally, discloses a drive mechanism for driving the said final drive wheel, at any of three rotative speeds, this being effected by means adapted to selectively and interchangeably bring either the drive shaft pulley or one or the other of two idler pulleys in frictional driving engagement with the rim of said wheel, said idler pulleys being preferably belt driven from the drive shaft which affords the said drive pulley.

Among the objects of my invention, which are achieved by virtue of the practice of my invention, are the following:

To provide an improved selective plural speed friction drive mechanism for phonograph turntables which is efficient in operation, can be manufactured in quantity production, at a relatively low cost, and will be durable and reliable in use.

To provide an improved selective speed driving mechanism for rotating a final drive wheel thereof at any of two or three different rotational speeds, one of which speeds being achieved by selectively engaging a pulley portion of a motor actuated drive shaft with the periphery of said wheel, and other wheel speeds being achieved by selectively effecting engagement by the periphery of said wheel with one or two additional idler pulleys, which in turn are driven preferably by one or more belts, from said motor shaft.

To achieve the foregoing objects through the provision of an adjustment mechanism for alternately engaging the final drive, or idler wheel solely with one or the other of the two or more pulleys, and which is adapted to concurrently remove the said idler wheel from engagement with a pre-engaged one of said pulleys in an improved manner.

To provide an improved adjustment mechanism, for achieving any or all of the foregoing objects, which comprises a laterally swingable lever and also comprises yieldable resilient means adapted to operatively maintain the adjustment mechanism in any selected position of adjustment.

To provide an improved drive mechanism for phonograph turntables whereby any or all of the foregoing objects may be achieved and which may be unitarily removably secured to a platform which rotatably supports a phonograph turntable either as original or replacement driving means for such turntable.

To provide an improved drive mechanism for phonograph turntables whereby any or all of the foregoing objects may be achieved and which comprises a speed selecting handle which is adapted for movement in a path which is of uniform directional nature throughout to a plurality of adjustment positions which are interspaced in said path.

To provide an improved drive mechanism for phonograph turntables whereby any or all of the foregoing objects may be achieved wherein the degree of pressure exerted between the peripheral pulley portions of serially related pairs of friction driving elements of the mechanism of which one thereof is the final drive friction wheel of the mechanism which is initially determined by the force exerted by yieldable spring means of the mechanism.

To provide an improved drive mechanism for phonograph turntables whereby any or all of the foregoing objects may be achieved wherein the degree of pressure exerted between the peripheral pulley portions of serially related pairs of friction driving elements of the mechanism of which one thereof is the final drive friction wheel of the mechanism which is initially determined by the force exerted by yieldable spring means of the mechanism and wherein during the driving of said turntable by said wheel the degree of such pressure engagement is variably increased according to the load imposed upon said wheel by the driven turntable.

Other objects of my invention and the invention itself will be apparent to those skilled in the art to which my invention pertains by referring to the following written description of a preferred embodiment of my invention and to the accompanying drawings which illustrate the said embodiment.

Fig. 1 illustrates an embodiment of my invention in top plan view, herein shown as detachably secured to a supporting plate of a phonograph, on which a phonograph turntable post is journalled, a fragment of a pendant peripheral flange of said turntable being shown in horizontal section, and wherein a fragment of the final drive, or idler wheel of the mechanism is indicated as broken away to expose certain parts disposed therebelow, the view showing the mechanism selectively adjusted to drive said wheel at one of three different speeds.

Fig. 4 is a view of the transmission elements of said embodiment adjusted as in Fig. 1, the view being mostly in side elevation and as if taken from the plane indicated by the line 4—4 of Fig. 1.

Fig. 5 is a view of the same nature as that of Fig. 4, being also mostly in side elevation and as if taken from a line of vertical section which is indicated at 5—5 in Fig. 1.

Fig. 6 is a top plan view of a selectively operable speed adjustment lever for the mechanism of the same embodiment.

Fig. 7 is a top plan, and Fig. 8 is a side elevational view of a detent leaf spring for yieldably retaining the lever of Fig. 6 in any of three adjustment positions, Fig. 8 additionally showing a vertical sectional view of said lever taken on the line 8—8 of Fig. 6, and the supporting plate disposed therebelow being indicated on a corresponding line of section.

Figs. 9 through 17 relate to a second embodiment of my invention whereof:

Figs. 9 and 10 are respectively top plan and side elevational views of a detent leaf spring which may be employed instead of Fig. 5.

Figs. 11 through 16 are views relating to said second embodiment and respectively being of the nature of Figs. 1 to 6 inclusive.

Figure 1:
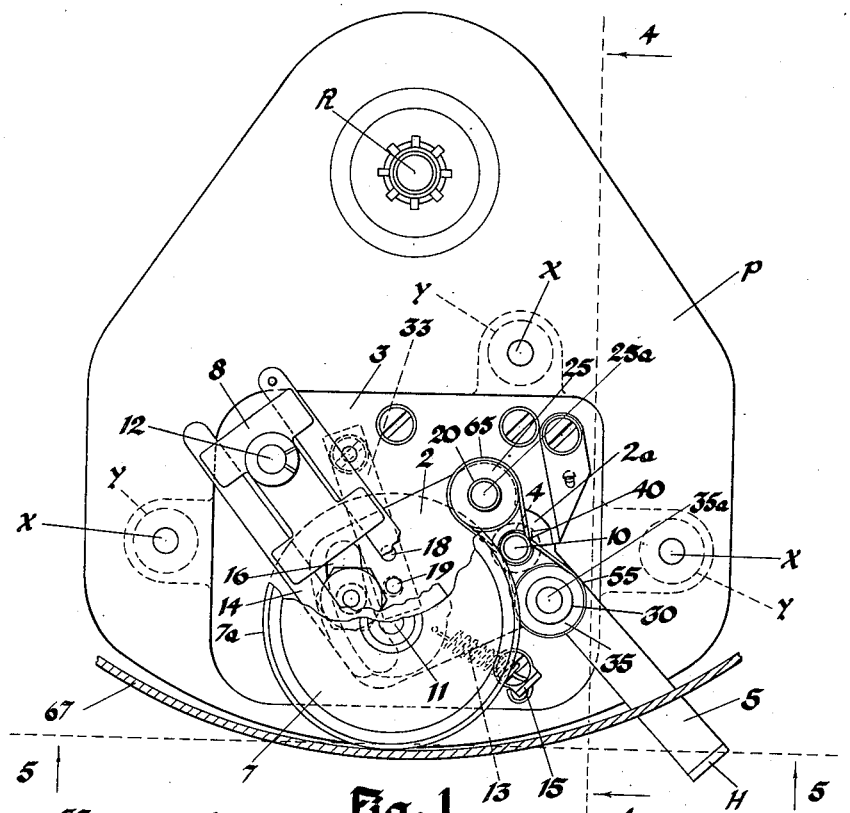
Figure 2:
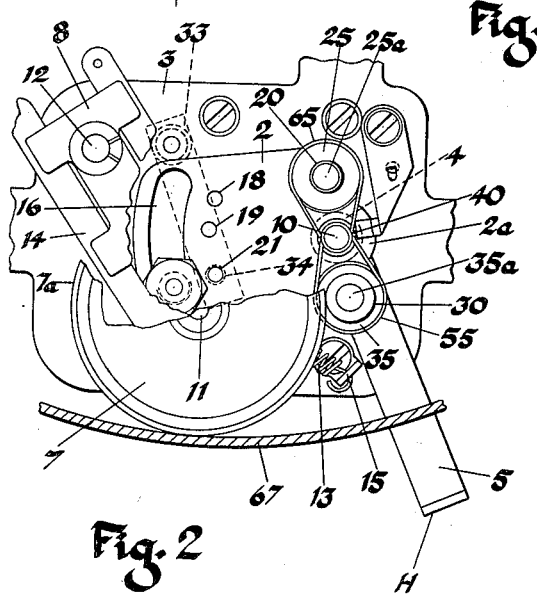
Fig. 2 is a view similar to that of Fig. 1, showing the mechanism selectively adjusted to drive said wheel at another of said three different speeds, but in this view the showing of the said supporting plate is omitted.
Figure 3:
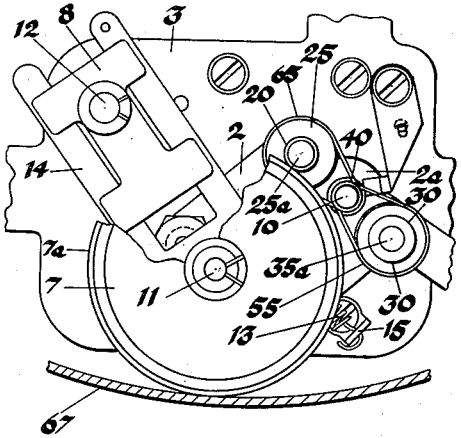
Fig. 3 is a view similar to that of Fig. 2, showing the mechanism selectively adjusted to drive said wheel at a third of said three different speeds.
Figure 11:
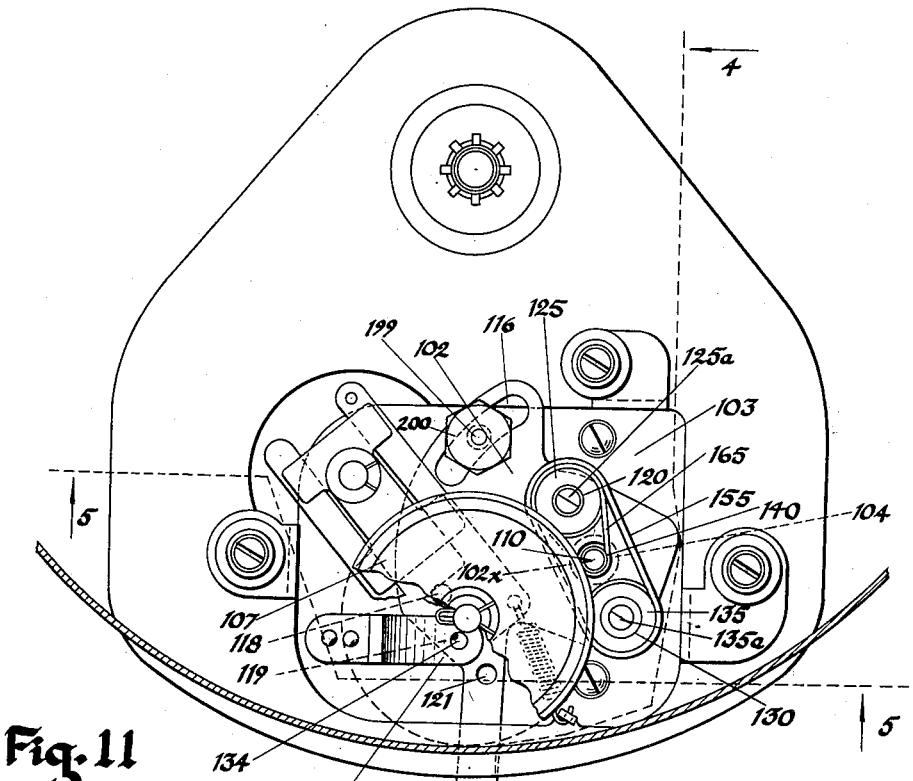
Figures 12, 13:
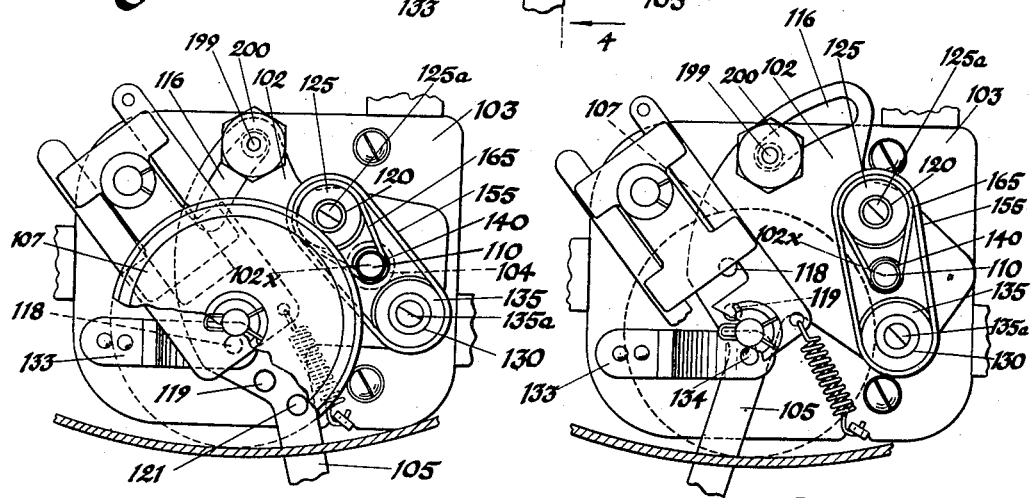

Fig. 17 is a view corresponding to that of Fig. 11 but illustrating a modification.

Referring now to the different figures of drawings in which like parts are designated by like reference characters, all of the operative elements of my improved mechanism cooperate to drive a friction wheel 7 at any of three different rotational speeds, so that by application of said wheel 7, a pendant peripheral flange, such as that shown at 67, or other annular element of a phonograph turntable T, may be frictionally driven at any of three different peripheral speeds.

Preferably, all of said operative elements are carried by a common support such as the sheet metal plate 3, an electric motor M, being pendantly supported from said plate and having its rotatable shaft 10 projected upwardly through an aperture thereof.

Telescoped over said shaft, and fitting snugly within the aperture, is an annular flange 4 of a generally flat, sheet metal adjustment plate 2, said flange being formed by perforating the plate 2 and bending downwardly portions of the plate bordering the aperture. The plate 2 is thus journalled about the center of the aperture, or expressed otherwise, may be adjustably swung about the axis of the motor shaft 10, said adjustment plate being adapted to function as a lever about said axis, and being manually swingable by its handle portion 5.

The lever 2, best shown in Fig. 6, comprises the handle 5, said journal flange 4 being pressed from a body portion 2a of the lever, which is also perforated at 27 and 37 at two sides of said flange 4, it also having an arcuately shaped aperture at 16, and three small circular apertures 18, 19 and 21.

The motor shaft is provided, substantially above the plate 3, with a friction pulley portion 40, and between the portion 40 and the upper surface of said plate has a cylindrical surface of substantial length over which portions of a pair of oppositely extending rubber or equivalent belts 55 and 65 are separately looped.

A slide 14 carries an upstanding post 11, on which the friction wheel 7, which has a peripheral rubber or equivalent rim 7a, is journalled for rotation, said slide adapted for longitudinal sliding movement on a carrier mount 8, the latter being journalled for lateral swinging movement on an upstanding post 12 whose lower end is affixed to the plate 3.

A tensile coiled spring 13 secured by its two ends to the end of the slide 14 which carries the wheel 7, and to a projection 15 of the plate 3, yieldably constrains the wheel toward such a lateral position where its rim may laterally engage the pulley element 40 of the motor shaft or either of the upper pulley elements 20 or 30 of the stepped pulleys 25 or 35 respectively, depending upon which of said pulley elements is so disposed as to first engage the wheel periphery when the wheel is yieldably pulled by the spring while engaged with the driven annular element of the turntable T, such as the flange element 67 thereof.

The pulleys 25 and 35 are journalled upon upstanding posts 25a and 35a whose lower ends are rigidly affixed to the lever portion 2a, within the respective apertures 27 and 37 thereof, and each comprises an axially bored body whose bore receives the post upon which the pulley is journalled, and whose outer lateral surface is of stepped formation to afford for each pulley, a lower medially crowned pulley element and a superposed upper cylindrical pulley element which, in each case, in the present embodiment, is preferably of lesser diameter than the lower pulley element of the same pulley.

Relatively upper and lower belts respectively at 55 and 65, of appropriate rubber or other preferably elastic material are employed to communicate rotary motion to the stepped pulleys 25 and 35, the upper belt 55 being looped over the relatively higher shaft portion 26 and the said pulley element 35, while the belt 65 is similarly looped over the relatively lower shaft portion 12 and the said pulley element 25.

The said pulley elements 25 and 35 are of the conventionally crowned type and, like the two said belts which respectively encompass each of said portions together with the shaft portion 26 or 12, as the case may be, are vertically interspaced, and the crowning of the said pulley portions maintains the belts at substantially constant levels as indicated by the drawings.

The upper portions 20 and 30 of the stepped pulleys 25 and 35 respectively are of substantially different diameters and the portion 20 of the pulley 25 is much longer than the portion 30 of the pulley 35, the greater length of the portion 20 being effective to dispose its upper end portions 20 at the level of the idler wheel 7 in order that it may be peripherally engaged by the rubber rim of said wheel; the pulley 35 is provided with a base portion 22 in order to elevate the pulley element 35 thereof to the level of the portion 26 of the motor shaft.

The pulleys 25 and 35 each have a vertical axial bore proceeding from their lower ends so that they may be telescoped over and journalled upon their respective vertical supporting posts 25a and 35a whose lower ends are rigidly anchored, preferably by riveting, within apertures 27 and 37 of a manually operable adjustment member 2.

The member 2 is herein shown as a sheet metal lever having a handle 5 and which is pivotally secured on the plate 3 by a turned down annular flange 4, which closely fits within the circular aperture of the plate 3, and through the central portion of which aperture the motor shaft extends, the shaft diameter being less than the inside diameter of said flange.

The lever 2 may therefore be swung about an axis which corresponds with the axis of the motor shaft 10, and when so swung in alternate directions by its handle 5, the pulleys 25 and 35 are circuituously moved about said shaft axis, whereby with the axes of the shaft 10 and of the pulleys 25 and 35 being aligned in the same general plane, at the same side portion of the wheel 7, the lever 2 will cause the said upper pulley portion of one of said stepped pulleys 25 or 35 to approach the periphery of the wheel 7, and the upper pulley portion of the other said stepped pulley to recede therefrom; an extreme manually effected adjustment movement of the lever 2 in either direction will cause the upper cylindrical pulley portion of the approaching pulley to be peripherally engaged with the idler wheel rim 7a, so that said wheel will be rotated by power transmitted to said approaching pulley from the motor shaft through the belt which encompasses said shaft and the lower portion of said pulley.

When the lever 2 is set to its midway position of adjustment, the upper pulley portions 20 and 30 of both said pulleys 25 and 35, respectively, are peripherally disengaged from the idler wheel rim, so that said rim will engage the motor shaft pulley element 40 and be frictionally peripherally driven thereby; the spring 13 maintains pressure engagement between said wheel rim 7a and whichever of said pulley elements 40, 20 or 30, which is adjusted most forwardly toward the wheel 7.

The lever 2 will be yieldably maintained in any of the three described adjustment positions by the effect of a metal bearing ball 34 which is held captive within the side edges which border an opening in the plate 3, and downward and upward movement of the ball is respectively restrained by the relatively underlying portion of the leaf spring 33, of Figs. 7 and 8, and by the relatively superposed portion of the lever 2 which is provided with a series of apertures 18, 19 and 21, all of which are of smaller diameter than the ball and into any of which the ball 34 is adapted to be interchangeably partially projected, by a snap action movement induced by the upwardly directed resilient force of said spring 33.

The belts 55 and 65 being of rubber and the rim 7a of the idler wheel 7 being also of rubber, the motor shaft pulley element 10, the pulley elements of pulleys 25 and 35 may be of metal, while tonal vibrations are prevented from reaching the driven surface of the turntable from the other operative parts of my improved mechanism.

The second embodiment which is illustrated in Figs. 9 through 16 and a modification being shown thereof in Fig. 17 is generally of the nature of the said first embodiment but differing chiefly in the arrangement of the two belts 155 and 165 which are disposed at the same level, instead of being at such different levels as are the belts 55 and 65. By placing the two belts at the same level, the vertical extent of the apparatus carried at the upper side of the common supporting plate 103, is lessened thereby contributing to greater compactness, but at the same time the belt arrangement of said first embodiment does not require that one of the belts, as now shown, at 155 in Fig. 11, must be disposed laterally over and in partially embracing relation to the other belt, as at 165, Fig. 11, which arrangement requires somewhat greater care to insure that the outermost belt 155 will drive the idler pulley 135 at a desired uniform rotative speed with respect to the rotative speed of the motor shaft pulley 140 which is afforded by the motor shaft 110.

However, by the arrangement of the two belts at the same level in the presently described embodiment, the idler pulleys 125 and 135 which are journalled to rotate on vertical extending posts 125a and 135a whose lower ends are rigidly affixed to the swingable adjustment lever 102, the pulley portions of each of said pulleys which are embraced by said belts may be disposed at the same level and additionally the upper pulley portions 120 and 130 which are adapted for peripheral engagement with the rim of the final drive or idler wheel 107, may also be of the same length and without the necessity of providing an elongated base portion such as shown at 22, Fig. 4, for one of said pulleys; in other words, in the present second embodiment, the upper pulley portions 120 and 130 are of equal length and are at the same level throughout, and at the same time the lower pulley portions 150 and 160 respectively of the pulleys 125 and 135 are similarly vertically co-extensive and at the same level, and each of said pulley portions 150 and 160 are medially crowned so that when driven by the two belts the said belts will be maintained at a constant level in accordance with well-known belt and pulley practise.

The two pulleys 125 and 135 are generally constructed in the same manner as that described in the said first embodiment, each having a vertical axial bore proceeding from their lower ends, said bores being capped at their upper ends and the pulleys being telescoped and journalled upon their respective posts 125a and 135a which are rigidly anchored within apertures 127 and 137 of the manually swingable adjustment lever 102 whose axis of swinging is at 102x. The said lever plate 102 is provided with a handle 105 and a laterally interspaced series of apertures 118, 119 and 121 for the reception of a detent projection 134 of the spring 133 shown in Figs. 9 and 10, said spring being secured to the mounting plate 103 by rivets projected through apertures of said spring and into the supporting plate 103. The swinging axis of the adjustment lever 102 is provided by providing said lever with a downturned tubular flange 104, which closely fits within a circular aperture of the plate 103, said aperture adapted to permit the motor shaft 110 to be projected upwardly therethrough, and thereby providing the swinging axis about which the lever is adjustably swung to three different adjustment positions to dispose the detent portion 134 of the spring 133 in one or the other of said apertures 118, 119 or 121.

The plate 102, in correspondence of the first embodiment is provided with an arcuate opening 116 for the reception of the shank of a bolt which is projected through an aperture of the mounting plate 103 and at the upper end of the bolt, whose head is shown at 199, a nut 200 is placed, the shank of said bolt limiting swinging movement of the lever 102 by engagement with the two end edges of the aperture 116.

Having described the operation of the apparatus of the first embodiment, it is not necessary to repeat the description for the present second embodiment, since the operation in both cases is precisely alike.

The foregoing description of the structure of each of the two embodiments of my invention contemplates driving of the final drive wheel, 7, or 107, and also the turntable T, at any of three different speeds, but, if it is merely desired to construct the mechanism for driving such wheel and turntable at either of two different speeds, it will be understood that this may be readily achieved by removing that one of the idler pulleys 25 or 35 as in the first described embodiment, and for the second embodiment, that one of the idler pulleys 125 or 135 which is not required.

Alternatively, driving at one of only two different speeds may be achieved by causing the adjustment lever 2 to alternatively effect engagement between the periphery of the idler wheel and the upper pulley portion of one or the other of said idler pulleys, and to avoid adjusting the mechanism for effecting peripheral engagement between said wheel and said drive pulley 40.

With the above explanation, it is not necessary that separate drawings hereof be provided to illustrate the mechanism wherein one of the idler pulleys is omitted and the periphery of the idler wheel is alternately selectively engageable with either of the drive pulleys 40 or 140, and the upper idler pulley portion of the sole remaining idler pulley.

It is obvious that any selective three-speed drive mechanism of the character of applicant's is, as a matter of choice, a two-speed driving mechanism.

As previously shown, all of the parts of my improved mechanism are unitarily supported by a common plate which affords a frame for the mechanism, said plate for the first said embodiment being shown at 3 and the wheel 7 constitutes a final drive element of the mechanism, said plate 3 adapted by means of screws X and rubber sound insulating grommets Y to be detachably secured to a platform such as that shown at P, which normally supports a rotatable turntable post R upon which the turntable T is carried. The drive wheel 7 being provided with a rubber sound insulating rim is adapted when the frame 3 is mounted as stated to peripherally engage the inner surface of the turntable flange 67, to drive said turntable. The manually operable speed selecting lever 5 forming a handle portion at H is adapted to be operated by moving said handle in an arcuate path of movement to the three different speed selecting positions as described, said path being advantageously of uniform directional nature throughout.

The direction of rotation of the motor shaft 10 is such that when the wheel 7 is driven by any of the pulleys 20, 40 or 30, the wheel 7 is rotated in a clockwise direction in order to drive the turntable, also, in a clockwise direction. The spring 13 is mainly relied upon to maintain the proper degree of pressure engagement between the rim of the wheel 7 and any operatively positioned one of the pulleys 20, 30 or 40, when such pressure is slightly augmented by the tendency of the drive wheel 7 to roll along the flange 67 in what might be called the counter-clockwise direction, the tendency toward such rolling effect resulting from the reactive effect of the driving torque imposed upon the turntable by said wheel 7. The rolling tendency assists the spring 13 in securing the proper degree of pressure engagement between the wheel rim and said flange 67 and also the operatively positioned one of said pulleys whereby the pressure engagement may be slightly increased as a result of such torque whenever the turntable imposes an increased load upon said wheel. The straight line spacing between the most remote pulley 20 and the point of engagement by said wheel of said turntable flange being substantially less than the diameter of the wheel, the actual reactive rolling of the wheel is substantially negligible except for contributing to the pressure of engagement by said wheel with said flange and selected pulley.

Thus the degree of pressure engagement by said wheel with the driving and driven parts comprise a substantially constant pressure slide by said spring means 13 and a slightly variable component afforded by the above described reactive torque effect.

I am aware that my invention is susceptible of being employed in different embodiments from those disclosed herein, and the elements hereof may be subjected to considerable variance in form and arrangement, but still being operative according to the principles of my invention.

I claim:

1. A plural speed frictional drive mechanism for phonograph turntables of the general type characterized by the provision of a final drive wheel adapted for peripheral frictional driving engagement with an annular element of a phonograph turntable, said mechanism comprising in combination with said wheel having a friction rim, and a journal upon which said wheel is adapted to rotate on an upwardly directed axis, an electric motor, a drive shaft rotatable responsive to energization of said motor, a plurality of pulley elements each disposed laterally of said shaft, said elements and said shaft being rotatable on axes which are parallel to the axis of said wheel, transmission belting to concurrently transmit rotary motion from said shaft to each of said elements, said shaft and said elements each having a wheel rim engageable pulley portion disposed at the common level of the rim of said wheel, said wheel engageable pulley portions being of substantially different diameters, and adjustment means for interchangeably relatively disposing any selected one of said wheel-engageable pulley portions in relative peripheral engagement with said friction rim, and spring means adapted to yieldably resiliently maintain said friction rim in frictional engagement with any said selected pulley portion.

2. A plural-speed driving mechanism for a phonograph turntable of that type having an annular pendant flange and journalled for rotation upon a fixed platform, comprising a frame, a motor having a vertically directed shaft in the form of a driving rotor, a pair of idler rotors, a friction wheel, a common laterally movable mount for said idler rotors and said mount affording a pair of relatively closely laterally interspaced journals one for each of said idler rotors, said shaft rotor being disposed between said idler rotors, a laterally floating mount for said wheel, a pulley element for each said rotor disposed at the level of, and laterally adjacent to, the periphery of said wheel, spring means constantly exerting an effort upon said wheel mount tending to move said wheel in a constant general direction, a pair of relatively superposed belts for transmitting power from said shaft to rotate a different one of said rotors and being rotatable on axes which are parallel to the axis of said wheel, said rotor mount being laterally movable to any of three adjustment positions to interchangeably adjust the relative lateral positions of said pulley elements with respect to the periphery of said wheel, said motor and said mounts being supported upon said frame, said frame adapted to be interfitted with and supported by said platform in such a position relative to an inner surface of said turntable flange as to effect engagement of the friction wheel therewith, and a single manually movable control member adapted to successively move said rotor mount to any of said three adjustment positions and in each of which said mount selectively disposes one only of said pulley elements in engagement with a portion of the periphery of said wheel, and the general direction in which the recited effort by said spring means is exerted upon said wheel being such as to tend to concurrently resiliently press said wheel periphery against the periphery of said selected one of said elements and against said flange surface, and the spacing between the flange and element engaged portions of the wheel periphery being substantially less than a diameter of the wheel.

3. In a unitary frictional drive mechanism, adapted to frictionally drive a phonograph turntable which is fixedly journalled on a turntable support and is provided with a pendant flange affording an inner annular surface, said mechanism being of that type characterized by the provision of a rotatable friction wheel having a non-sound conducting friction rim of small diameter as compared with the diameter of said flange and being adapted to be peripherally engaged with such a turntable flange surface, the combination with such wheel, a motor having a vertical upwardly projecting shaft element, a pair of rotors respectively disposed at opposite sides of said shaft and both being belt driven thereby, said shaft and said rotors being each separately journalled for rotation about axes which are each parallel to that of said wheel and each comprising a pulley element disposed at the level of, and in close lateral proximity to, said wheel rim and each element being interchangeably adapted for peripheral engagement therewith, said elements being of relatively different diameters to drive said wheel at different speeds, a laterally shiftable mount upon which said wheel is journalled, spring means exerting such an effort upon said mount as to tend to laterally shift said wheel in a constant direction, a common frame supporting said motor, rotor elements, and wheel, said frame being so secured to a turntable support as to so position said wheel with respect to the inner surface of the turntable flange surface, a manually movable adjustment member carried by said frame plate adapted for movement to any of three different adjustment positions, and at least a pair of said elements being adapted for such lateral movement responsive to any adjustment movement of said member as to interchangeably effect engagement between a segment of the wheel rim, and any of said elements, said rim segment being one of a pair of quadrantal segments which are separated by the remote half of that diameter of the wheel which extends from said flange engageable restricted rim portion and being that one of the pair which, considering the direction of rotation of the wheel, precedes the other in rotary movement to the flange engageable position.

4. In a unitary selective plural-speed drive mechanism for fixedly journalled phonograph turntables of the type having a pendant annular flange comprising a supporting frame, a wheel having a friction rim of non-sound conducting material, a pair of laterally interspaced rotors, a motor and a shaft therefor, belt means disposed in power transmitting relation to said shaft and to said rotors to so drive said rotors from said shaft that both said shaft and rotors are rotating in the same direction, a universally laterally movable mount affording a journal for said wheel and a laterally adjustable mount affording separate journals for each of said rotors, said mounts and motor being supported by said frame, each of said rotors and said shaft comprising a pulley element, each of relatively different diameters and all three pulley elements and said wheel being rotatable on vertical axes, and said pulley elements being each disposed at a common level with said wheel rim and said wheel and elements being rotatable on laterally interspaced vertical axes, and said rotor elements being so positioned on said mount as to dispose all of said elements in relatively serial laterally interspaced relation, an adjustment member manually movable on said frame to any of three successive positions and adapted when so moved to successively so move said rotor mount as to successively dispose respective of said elements in a relatively most forward position with respect to a minor segment less than a quadrant of the circumference of the wheel rim, spring means adapted to constantly exert a laterally directed effort upon said wheel mount, said frame adapted to be so interfitted to an element of means supporting a pendantly flanged turntable as to thereby cause said wheel to tend to be recedingly deflected as a result of peripheral engagement by the inner surface of said turntable flange in opposition to the effort of said spring means yieldably tending to move said wheel laterally into a space between a wheel-engaged portion of such flange and said most forwardly adjusted one of said elements, and the diameter of said wheel being substantially greater than the width of any such space as provided in any of the three adjustment positions of the rotor mount, whereby substantially less than half of said wheel circumference is wedgingly disposed between any said most advanced element and said inner turntable flange surface, and is adapted to be yieldably maintained in such relation thereto by the effort of said spring, said rotors and pulley elements thereof being of such relative diameters as to adapt each of said elements to drive said wheel and any turntable operatively associated therewith at substantially different rates, in the same rotative direction.

5. A driving mechanism for phonograph turntables of the general type wherein a final drive wheel is adapted for peripheral driving engagement with an annular element of the turntable, comprising the combination with said wheel, a motor, a motor actuated drive shaft element, a pulley element, each of said elements being rotatable on upwardly directed axes which are substantially parallel to that of said wheel, each said element having lower and upper pulley portions, the lower pulley portions of both said elements and the upper portions thereof, being disposed at corresponding levels, belting means looped over a pair of said portions which are at the same level so as to transmit rotary motion from said shaft element to said pulley element, and said pair of portions being relatively of substantially different diameters, the other pair of said portions being both disposed at the level of the rim of said wheel, and adjustment means adapted for manually effected movement in a path of movement which is directionally of uniform nature throughout to interchangeably effect peripheral engagement of said wheel rim with either one of said pulley portions which are disposed at the level of said rim.

6. A motor-actuated driving mechanism of the general type having a final drive friction wheel rotatable on a vertical axis and adapted to be peripherally frictionally engaged with an annular part of a phonograph turntable for driving the same, said mechanism comprising in combination with said wheel, an electric motor, a power-delivery shaft for the motor, said shaft comprising a vertically upwardly extending portion affording three successively disposed pulley portions, a pair of idler pulley elements each being so constructed as to afford a pair of axially aligned upper and lower pulley portions, the uppermost pulley portions of said shaft and of said pulley elements being disposed at the level of the periphery of said wheel, and the said uppermost shaft portion being laterally disposed between the said uppermost portions of said pair of elements, and the lower pulley portions of said pair of elements being respectively disposed at the level of a different one of the two lower of said shaft pulley portions, a belt encompassing and frictionally engaging each lower pulley portion of said pair of elements and that one of said shaft pulley portions which is at the same level, whereby said belts are disposed at different levels and each is adapted to independently transmit power from said shaft to a different one of said elements, supporting means for said wheel, motor and elements, and said wheel being so mounted upon said supporting means as to be readily shiftable in lateral directions and restrained from vertical movement, spring means yieldably constraining said wheel towards said upper pulley portions of said shaft and elements, and an adjustment member manually movable to any of three different adjustment positions and comprising means adapted when so moved to simultaneously shift the lateral positions of said elements with respect to the periphery of said wheel whereby in one adjustment position said wheel periphery is engaged with said upper shaft portion, and in the other positions one or the other of said upper element portions is engaged with said wheel periphery.

7. A motor actuated driving mechanism for phonograph turntables of that class wherein a final drive wheel thereof is adapted to be peripherally frictionally engaged with an annular inwardly facing surface of an annular portion of a turntable comprising, in combination with said wheel, a laterally movable mount having a portion affording a journal for said wheel, a spring yieldably tending to move said mount and wheel in a general direction of movement, a motor having an upwardly directed rotatable drive shaft element, and a power transmission belt, an idler pulley element journalled to rotate on an axis which is substantially parallel to those of said wheel and said shaft element, said shaft element comprising a pair of relatively superposed portions each affording a pulley surface, said idler pulley comprising a pair of relatively superposed pulley surface portions one being disposed at the level of one of said shaft pulley portions and the second being disposed at the level of the second of said shaft pulley portions, said belt embracingly looped over and engaging pulley surface portions of said elements which are at substantially the same level, the other pulley portion of each said element being disposed at the level of the rim of said wheel and being relatively interchangeably frictionally engageable therewith, said belt-engaged pulley portion of said idler pulley being of substantially greater diameter than said belt-engaged pulley portion of said shaft element whereby said idler pulley is driven from said shaft through said belt at a predetermined lower rotational rate than that of said shaft element, and manually movable adjustment means adapted to be moved in a path of movement which is directionally of uniform nature throughout to different adjustment positions, in different of which the rim of said wheel is caused to be selectively peripherally engaged with one or the other of the said pulley portions of the respective elements which are disposed at the level of said wheel.

8. A plural speed drive for phonograph turntables comprising a mechanism unitarily carried upon a plate which is adapted to be removably secured to a frame upon which a turntable is journalled, said mechanism being of the general type which is characterized by the provision of a final drive wheel adapted for peripheral frictional driving engagement with a laterally facing annular portion of the turntable, said unitary mechanism comprising a motor, a vertical drive shaft element thereof, said drive wheel, a stepped idler pulley element, an adjustable member upon which said idler pulley is journalled, a transmission belt, and a spring, said shaft and pulley elements and said wheel being separately journalled to rotate on vertical laterally interspaced axes, and said pulley element and said wheel being so mounted as to permit independent lateral movements thereof, said belt encircling portions of said shaft and pulley elements to effect driving of said idler element by said shaft element, other relatively horizontally aligned pulley portions of said elements being disposed at the level of the rim of said wheel and being interchangeably engageable therewith in response to adjustment movements of said member to different adjustment positions, a manually operable adjustment handle adapted when moved in a path of uniform directional nature throughout to adjustably move said member to a selected one of said wheel rim and said belt being of substantially negligible sound-conducting material, and said spring yieldably urging said wheel toward such a general lateral direction as to cause its operative position to be limited by simultaneous spring pressed wedging engagement of angularly different portions of its rim with a said wheel engageably pulley portion of either of said elements and with a portion of said inwardly facing annular surface of a turntable when said frame is operatively so secured to the supporting frame of said turntable, as to present a portion of the wheel periphery to said turntable surface.

9. A plural speed friction drive mechanism adapted to drive a phonograph turntable of the type having a pendant annular flange, comprising a motor and an upwardly directed drive shaft, a pair of idler pulleys and a laterally adjustable common mount therefor, a final drive wheel and a laterally shiftable carrier therefor, said shaft, wheel and pulleys each journalled to rotate on relatively parallel axes, belt means encompassing said shaft and first portions of said pulleys, said pulleys having second portions disposed at a different level within which the rim of said wheel is disposed, said shaft being projected substantially in relative parallelism between said pulleys, and spring means adapted to exert a laterally directed effort upon said wheel carrier to tend to laterally shift said wheel toward peripheral engagement thereof with said shaft, and said pulley mount being adjustable to any of three different adjustment positions, in the first two of which respectively a second pulley portion of one or the other of said pulleys is caused to engage the rim of said wheel and to laterally deflect said wheel to move it so that its rim is moved out of engagement with said shaft, and said mount when moved to a third position of adjustment adapted to effect disengagement of both of said pulley portions from said wheel rim, and to restore said wheel rim to peripheral engagement with said shaft.

10. A plural speed friction drive mechanism adapted to drive a phonograph turntable of the type having a pendant annular flange, comprising a motor and an upwardly directed drive shaft, an idler pulley and a laterally adjustable mount therefor, a final drive wheel and a laterally shiftable carrier therefor, said shaft, wheel and pulley each journalled to rotate on relatively parallel axes, belt means encompassing said shaft and a first portion of said pulley, said pulley having a second portion disposed at a different level whereon the rim of said wheel is disposed, and spring means adapted to exert a laterally directed effort upon said wheel carrier to tend to laterally shift said wheel toward peripheral engagement thereof with said shaft, and said pulley mount being adjustable to any of two different adjustment positions, in the first of which a second pulley portion of said pulley is caused to engage the rim of said wheel and to laterally deflect said wheel to move it so that its rim is moved out of engagement with said shaft, and said mount when moved to a second position of adjustment adapted to effect disengagement of said second pulley portion from said wheel rim, and to restore said wheel rim to peripheral engagement with said shaft.

11. A friction drive mechanism substantially as set forth in claim 9 characterized by the provision of a manually operable actuating member comprising a handle movable in opposite directions in a path of uniform directional nature throughout, and said mount being adjustable to the recited three different adjustment positions by manually effecting placement of said handle at three different positions in said path and said mount being journalled for swinging adjustment movements about an axis of swinging which is so disposed that when swung to opposite extreme positions of adjustment one or the other of said pulleys is advanced past the point of engagement of said shaft and wheel rim.

12. A motor actuated driving mechanism for driving a phonograph turntable of the general type having a pendant annular flange whose inner surface is adapted to be peripherally engaged by a pulley wheel element of the mechanism, comprising a frame by which all parts of the mechanism are supported, said parts comprising in combination, said wheel, a laterally movable mount for said wheel, a motor comprising a shaft affording a drive pulley, a pair of idler pulley elements, spring means, and manually operable adjustment means, said shaft, said wheel and said elements being separately journalled for rotation on substantially vertical relatively interspaced axes, each of said elements comprising a wheel-driving pulley portion which is disposed at the level of the rim of said wheel and a second pulley portion which is disposed at a differing second level, transmission belting comprising portions looped around said drive pulley and each of said second portions adapted to effect driving of both said idler pulleys from said drive pulley, manually movable adjustment means adapted to adjustably so shift the relative positions of said elements with respect to said wheel rim as to selectively effect peripheral engagement between the rim of said wheel and either one of said wheel-driving pulley portions, said wheel rim adapted to engage and frictionally drive a concavely annular surface of a turntable by a peripheral portion thereof which is located substantially less than 180° from the portion of said rim which is adapted for engagement with the more remotely disposed idler pulley portion, the resilient effort of said spring means being so directed against said wheel mount as to tend to wedgingly force said wheel between any wheel-engaged idler pulley or said drive pulley and the engaged portion of said turntable surface, and the driving ratio as respectively determined by the respective diameters of said shaft drive pulley, and of said pair of wheel-driving pulley portions as compared to said wheel diameter being respectively different when said wheel is peripherally engaged by one or the other of said wheel driving pulley portions or by said drive pulley.

13. The friction drive mechanism substantially as set forth in claim 10, characterized by said wheel having its rim solely maintained in peripheral engagement with either said shaft or said second pulley, as the combined result of the recited resiliently effected effort of said spring means upon said wheel carrier, and the co-operative reactive effect on said wheel of driving torque exerted by said wheel upon said annular surface portion of said turntable.

14. The friction drive mechanism substantially as set forth in claim 10, characterized by the provision of a common frame by which all of the recited parts of the mechanism are supported, and said frame adapted to be removably secured to a phonograph turntable supporting frame upon which the turntable is journalled, as to effect engagement by a rim portion of said wheel with the inner annularly concave surface of the turntable flange and the rim of said wheel being solely maintained in concurrent peripheral engagement with said flange surface and either said shaft or any said second pulley portion as a result of the resilient effort of said spring means upon said wheel carrier, and of the co-operative result of the reactive effect on said wheel by driving torque exerted by said wheel upon said annular surface portion of said turntable being directed in such a direction as to tend to shift said wheel between said pulley portion and the rim-engaged portion of said turntable surface.

15. A motor actuated driving mechanism for driving a phonograph turntable of the general type having a pendant annular flange whose inner surface is adapted to be peripherally engaged by a pulley wheel element of the mechanism, comprising a frame by which all parts of the mechanism are supported, said parts comprising in combination, said wheel element, a laterally movable wheel mount for said wheel, a motor comprising a shaft, a pair of idler pulley elements, spring means, and manually operable adjustment means, said shaft, said wheel and said idler pulley elements being separately journalled for rotation on substantially vertical relatively interspaced axes, said shaft and each of said idler pulley elements comprising a wheel-driving pulley portion which is disposed at the level of the rim of said wheel and a second pulley portion, transmission means adapted to effect driving of both said idler pulleys from said shaft, manually movable adjustment means solely movable in a path of uniform directional nature throughout and adapted when so moved to different stations in said path to adjustably so shift the relative positions of said elements with respect to said wheel rim as to selectively effect peripheral engagement between the rim of said wheel and either one of said wheel-driving pulley portions, said wheel rim adapted to engage and frictionally drive a concavely annular surface of a turntable by a peripheral portion of the wheel rim which is located substantially less than 180° from the portion of said rim which is adapted for engagement with the more remotely disposed idler pulley portion, and said manually movable adjustment means having a third position of adjustment wherein the rim of said wheel is selectively disengaged from both said wheel-driving pulley portions and is engaged with said shaft, the resilient effort of said spring means being so directed against said wheel mount as to tend to wedgingly force said wheel between any wheel-engaged idler pulley or shaft and the engaged portion of said turntable surface.

16. A plural speed friction drive mechanism adapted to drive a phonograph turntable of the type having a pendant annular flange, comprising a motor and an upwardly directed drive shaft, a pair of idler pulleys and a laterally adjustable common mount therefor, a final drive wheel and a laterally shiftable carrier therefor, said shaft, wheel and pulleys each journalled to rotate on relatively parallel axes, belt means encompassing said shaft and first portions of said pulleys which are disposed at a common level, said pulleys having second portions disposed at the different level of the rim of said wheel, said shaft being projected substantially between said pulleys, and spring means adapted to exert a laterally directed effort upon said wheel carrier to tend to laterally shift said wheel toward peripheral engagement thereof with said shaft, and said pulley mount being adjustable to any of three different adjustment positions, in the first two of which respectively a second pulley portion of one or the other of said pulleys is caused to engage the rim of said wheel and to laterally deflect said wheel to move it so that its rim is moved out of engagement with said shaft, and said mount when moved to a third position of adjustment adapted to effect disengagement of both of said pulley portions from said wheel rim, and to restore said wheel rim to peripheral engagement with said shaft, and a frame unitarily supporting said motor, said mount, said carrier and said spring with said carrier being so disposed as to adapt a portion of said wheel rim for engagement with a laterally directed surface portion of said turntable flange and said wheel being laterally so positioned with respect to any relatively engaged of said second pulley portions and with said turntable flange surface portion and said motor being rotated in such a direction that the reactive torque resulting from driving of said turntable by said wheel causes said wheel to reactively tend to shift its carrier in such a lateral direction as to reinforce the effect of said spring means.

17. A plural speed friction drive mechanism adapted to drive a phonograph turntable of the type having a pendant annular flange, comprising a motor and an upwardly directed drive shaft, an idler pulley and a laterally adjustable mount therefor, a final drive wheel and a laterally shiftable carrier therefor, said shaft, wheel and pulley each journalled to rotate on relatively parallel axes, belt means encompassing said shaft and a first portion of said pulley, said pulley having a second portion disposed at the different level of the rim of said wheel, and spring means adapted to exert a laterally directed effort upon said wheel carrier to tend to laterally shift said wheel toward peripheral engagement thereof with said shaft, and said pulley mount being adjustable to any of two different adjustment positions, in the first of which a second pulley portion of said pulley is caused to engage the rim of said wheel and to laterally deflect said wheel to move it so that its rim is moved out of engagement with said shaft, and said mount when moved to a second position of adjustment adapted to effect disengagement of said second pulley portion from said wheel rim, and to restore said wheel rim to peripheral engagement with said shaft, and a frame unitarily supporting said motor, said mount, said carrier and said spring with said carrier being so disposed as to adapt a portion of said wheel rim for engagement with a laterally directed surface portion of said turntable flange and said wheel being laterally so positioned with respect to the rim engaged with said second pulley portion and with said turntable flange surface portion and said motor being rotated in such a direction that the reactive torque resulting from driving of said turntable by said wheel causes said wheel to reactively tend to shift its mount in such a lateral direction as to reinforce the effect of said spring means.

18. A driving mechanism for phonograph turntables of the general type wherein a final drive wheel is adapted for peripheral driving engagement with an annular element of the turntable, comprising the combination with said wheel, a motor, a motor actuated drive shaft element, a pulley element, each of said elements being rotatable on upwardly directed axes which are substantially parallel to that of said wheel, each said element having lower and upper pulley portions, the lower pulley portions of both said elements and the upper portions thereof, being disposed at corresponding levels, belting means looped over a pair of said portions which are at the same level so as to transmit rotary motion from said shaft element to said pulley element, and said pair of portions being relatively of substantially different diameters, the other pair of said portions being both disposed at the level of the rim of said wheel, and adjustment means adapted for manually effected movement in a path of movement which is directionally of uniform nature throughout to interchangeably effect peripheral engagement of said wheel rim with either one of said pulley portions which are disposed at the level of said rim, and the other pulley portions of said shaft and of said element being relatively of substantially different diameters.

19. A driving mechanism for phonograph turntables of the general type wherein a final drive wheel is adapted for peripheral driving engagement with an annular element of the turntable, comprising the combination with said wheel, a motor, a motor actuated drive shaft element, a pulley element, each of said elements being rotatable on upwardly directed axes which are substantially parallel to that of said wheel, each said element having lower and upper pulley portions, the lower pulley portions of both said elements and the upper portions thereof, being disposed at corresponding levels, belting means looped over a pair of said portions which are at the same level so as to transmit rotary motion from said shaft element to said pulley element, the other pair of said portions being both disposed at the level of the rim of said wheel, and adjustment means adapted for manually effected movement in a path of movement which is directionally of uniform nature throughout to interchangeably effect peripheral engagement of said wheel rim with either one of said pulley portions which are disposed at the level of said rim and the other pulley portions of said shaft and of said element being relatively of substantially different diameters.

20. A driving mechanism for phonograph turntables of the general type wherein a final drive wheel is adapted for peripheral driving engagement with a laterally facing annular surface portion of the turntable, comprising the combination with said wheel, a motor, a motor actuated drive shaft element having a pulley portion, an idler pulley element, each of said elements being rotatable on upwardly directed axes which are substantially parallel to that of said wheel, said idler pulley element having a lower and an upper pulley portion, the lower pulley portion of said pulley element being disposed at the level of a said pulley portion of said shaft element, a tensed elastic belt looped over said lower pulley portion of the idler pulley element and said shaft pulley portion so as to adapt it for transmitting rotary motion from said shaft element to said pulley element, the diameter of said shaft pulley portion being substantially less than the diameter of said lower pulley portion of said pulley element, the upper pulley portion of said pulley element being of less diameter than said lower pulley portion and being disposed at the level of the rim of said wheel, said rim being of rubber or like non-sound-conducting friction material, a laterally movable mount for said wheel and spring means constraining said mount in such a lateral direction as to engage a peripheral portion of said wheel rim with the said upper pulley portion of said pulley element, and both said elements with said wheel mount being so unitarily supported on a common frame, said frame being adapted to be so attached to a turntable platform that another peripheral portion of said wheel rim may be presented for engagement with said annular turntable surface and the effect of the laterally directed pressure exerted upon said wheel mount by said spring being so directed that said wheel may be maintained in spring-pressed peripheral relation to said turntable surface to adapt said wheel to transmit rotary motion from said idler pulley element to said turntable, the rotational speed of the turntable being determined by the relative diameters of all said pulley portions of both said elements.

HERBERT L. HARTMAN.

References Cited in the file of this patent

UNITED STATES PATENTS

| Number | Name | Date |
|---|---|---|
| 752,778 | Hundhausen | Feb. 23, 1904 |
| 2,130,931 | Rysick | Sept. 20, 1938 |
| 2,551,266 | Hartman | May 1, 1951 |

FOREIGN PATENTS

| Number | Country | Date |
|---|---|---|
| 523,398 | Germany | Apr. 23, 1931 |